April 3, 1956

A. A. KIRCHEL 2,740,686

MESSAGE CARRIERS FOR SCANNING SYSTEMS

Filed Feb. 7, 1952

Inventor
A. A. Kirchel
By Glascock Downing & Seebold
Attys.

United States Patent Office 2,740,686
Patented Apr. 3, 1956

2,740,686

MESSAGE CARRIERS FOR SCANNING SYSTEMS

Alan Arthur Kirchel, Beckenham, England, assignor to Muirhead & Company Limited, Beckenham, Kent, England Application February 7, 1952, Serial No. 270,379

Claims priority, application Great Britain February 26, 1951

9 Claims. (Cl. 346—138)

This invention relates to message carriers for transmitters or receivers of scanning systems.

In a facsimile telegraph system the message form may have attached to its teleprinter tape carrying the message information. When such a message form is applied to a facsimile transmitter employing a rotating drum, it is important that both the teleprinter tape and the form are held firmly against the drum to ensure that all the printed matter remains in the focal point of the transmitting light beam. For this purpose a film of transparent material is provided to encircle the drum and to press the form against the outside diameter of the drum.

Existing drums providing such a transparent wrapper are found to have two principal faults. Firstly, a measure of skill is required to load the message form correctly between the wrapper and the drum, and secondly, handling of the transparent wrapper quickly damages the surface of the transparent material and adversely affects transmission of the copy.

An object of the present invention is to provide a message drum employing a transparent wrapper that is simple to load and with which the transparent material is not handled during loading.

The invention consists of a message carrier for transmitters and receivers in which the material to be scanned is mounted on a drum structure characterised in that the drum structure comprises an outer drum mounted to revolve upon an inner drum against the action of a spring and a transparent wrapper attached to the outer drum at one end and adapted to be held in its wrapped position by the engagement of projections on the free end of the wrapper pressing, by the action of the spring, against projections extending from the inner drum.

The invention will be further described with reference to an embodiment shown in the accompanying drawings.

Figures 1, 2:
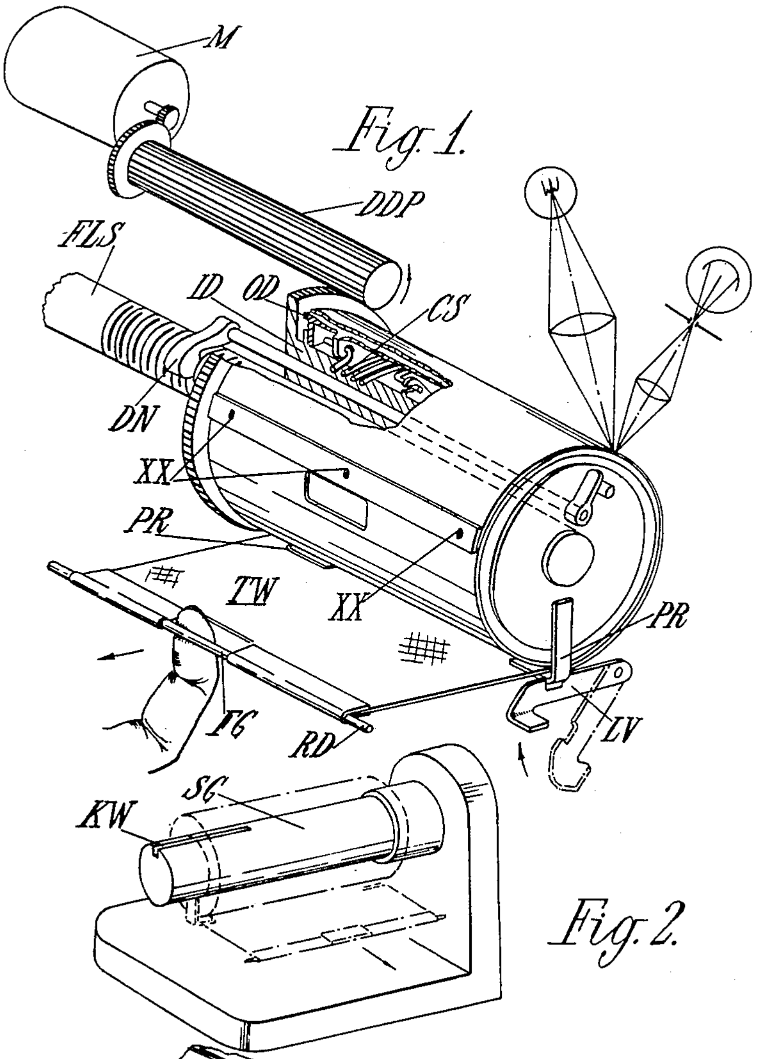
Figure 1 is a perspective view of the parts of a message carrier necessary to illustrate the present invention.
Figure 2 is a perspective view of a loading stand for use in conjunction with the message carrier of the invention.

Figure 1 of the drawings shows the device applied to an elementary form of facsimile transmitter. An outer drum OD is mounted to revolve freely upon an inner drum ID, which is driven by appropriate gearing and associated with a lead screw causing it to rotate and traverse past an optical scanning assembly of known type shown diagrammatically.

Attached to the outer drum at XX is one end of the transparent wrapper TW. Urging the outer drum in a counter-clockwise direction upon the inner drum is coil spring CS mounted between the drums. The outer and inner drums are held in their normal relative positions by spring CS, when the ends of rod RD on the free end of the wrapper are pressing against projections PR extending from the inner drum.

The centre portion of rod RD is exposed and may be slightly bowed to form a finger grip FG. Therefore, the wrapper can be pulled, rotating the outer drum upon the inner drum, the wrapper thus being held taut between the finger grip FG, and spring CS, as shown in the diagram. To facilitate this operation, lever LV attached to the frame of the transmitter or receiver, is provided to hold the inner drum in a convenient position by engaging the projection PR and also to take the reaction of spring CS.

The projections PR serve a dual purpose, firstly to hold the wrapper in the wrapped-up position by means of the rod RD and secondly, to form a slot or partial slot around the outside of the drum through which the wrapper is pulled in the extended position.

In a modified construction, the projections PR are connected together by means of a continuous rod, roller or strip, or may, in fact, be formed of one piece of strip, effecting thereby a continuous member keeping the wrapper in close proximity to the drum.

To load a message form to the drum, the transmitter is revolved until lever LV can be engaged with one extension PR. A finger of one hand is then placed on the finger grip FG and the wrapper TW pulled out to its fullest extent. With the other hand, the message form is then placed face downwards on to the transparent wrapper. The wrapper is then allowed to return to its normal position under the influence of spring CS. The message form is thus wrapped around, and held securely against, the outer drum and is ready for transmission.

The drum is shown in position on the facsimile apparatus and driven by the motor M over the drum driving pinion DDP; the drum nut DN engaging in the fixed lead screw FLS.

Figure 3:
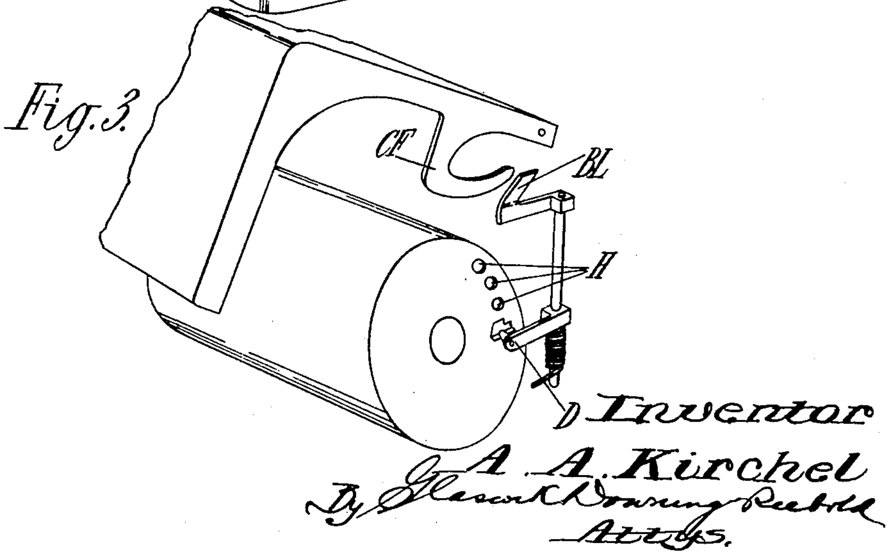
Figure 3 is a perspective view showing a modification.

The location of the drum, during the time the wrapper is extended, can also be catered for in the case where the drum is not removed from the machine, by an arrangement as shown in Figure 3.

A spring detent D engages with holes or slots H in the end of the inner drum, in the normal loading position, that is, when the cover protecting the drum is raised. When the cover is closed down, a cover finger CF engages with the bent lever BL, which withdraws the detent from the drum. The detent may be suitably formed so that it does not lock the drum completely but may ride in and out of the holes H if sufficient force is supplied to overcome the torque of the detent spring.

Should it be necessary to load the message form to the drum at a location away from the transmitting machine, an alternative arrangement is shown in Figure 2. The inner and outer drums ID and OD are made as a detachable assembly which can be removed from the transmitter, and this assembly is mounted on to a supporting and locating means SG for loading purposes. The drum assembly is held in a convenient position by keyway KW, engaging a key attached to the inner drum. The keyway KW may be flared at the end for more convenient entry of the key.

The loading of the message to the drum is then carried out in exactly the same way as described above, the key and keyway replacing the function of the lever LV, in holding the inner drums. The arrangement described is not limited in application to a telegraph system but may be applied to any machine, whether acting as transmitter or receiver, in which material to be scanned is mounted on a drum.

Various other modifications may be made within the scope of the invention.

I claim:

1. A message carrier for transmitters and receivers of scanning systems in which the material to be transmitted is mounted on a drum structure, characterised in that the drum structure comprises an inner drum projections extending therefrom, an outer drum mounted to rotate upon the inner drum against, a spring opposing said rotation a transparent wrapper attached to the outer drum at one end, and projections on the free end of the wrapper pressing in the wrapped position, by the action of the spring, against said projections extending from the inner drum.

2. A message carrier for transmitters and receivers of scanning systems, as claimed in claim 1, in which a rod secured to the free end of the wrapper forms by its ends the projections thereon, and at its centre part a finger grip for unwinding the wrapper.

3. A message carrier for transmitters and receivers of scanning systems, as claimed in claim 1, in which the projections extending from the inner drum also serve to form a slot or partial slot around the outside of the drum through which the wrapper is pulled in the extended position.

4. A message carrier for transmitters and receivers of scanning systems as claimed in claim 1, in which the inner and outer drums are made as a detachable assembly and which can be mounted on a supporting and loading means for loading purposes.

5. A message carrier for transmitters and receivers of scanning systems, as claimed in claim 1, in which a lever attached to the frame of the transmitter or receiver is provided to hold the inner drum in a convenient position.

6. A message carrier for transmitters and receivers of scanning systems, as claimed in claim 5, in which the lever engages one of the projections on the inner drum.

7. A message carrier for transmitters and receivers of scanning systems, as claimed in claim 1, in which said inner drum is provided with at least one aperture at one end, and a detent normally spring-pressed into drum-locking relationship in said aperture.

8. A message carrier as claimed in claim 7, including a movable cover for said drum structure, and cooperating means on said cover and on said detent for moving the latter away from said aperture when said cover is moved to its closed position.

9. A message carrier as claimed in claim 7, in which said detent has an end shaped to permit it to ride out of said aperture upon the application of sufficient turning force to said drum structure.

References Cited in the file of this patent

UNITED STATES PATENTS

| | | |
|---|---|---|
| 2,223,341 | Ernst et al. | Dec. 3, 1940 |
| 2,248,887 | Milnor et al. | July 8, 1941 |
| 2,356,999 | Hogan | Aug. 29, 1944 |
| 2,383,785 | Foster | Aug. 28, 1945 |
| 2,394,649 | Young | Feb. 12, 1946 |